Patented Nov. 4, 1947

2,430,346

UNITED STATES PATENT OFFICE 2,430,346

PROCESS OF RECOVERING MANGANESE FROM ITS ORES

John Koster, Crimora, Va., assignor to Crimora Research and Development Corporation, Crimora, Va., a corporation of Virginia No Drawing. Application February 26, 1945, Serial No. 579,884

2 Claims. (Cl. 23—145)

This invention relates, generally, to methods of extracting manganese from its ores and it has particular relation to treatment of such ores with sulphur dioxide to dissolve the manganese dioxide therein.

Prior to this invention, the recovery of manganese from its ores by the treatment thereof with solutions of sulphur dioxide has met with difficulty. In particular, difficulty has been encountered in the crystallization of a salt from the sulphate dithionate mixtures formed and in the conversion of such mixtures into oxide, carbonate or metal.

The aims of the invention include: the recovery of manganese from solutions formed by the reaction between manganese dioxide ores and solutions of sulphur dioxide in a directly usable form; the recovery from solutions containing manganese sulphate of the manganese as a pure crystalline salt which may be further treated to recover manganese in the form of sulphate dioxide, carbonate or metal; the production of manganese and ammonium sulphate crystals for use as fertilizer or plant food and as an agent for replenishing the manganese in manganese electro-plating solutions.

Other aims and advantages of the invention and the scope thereof are set forth in the following description and in the appended claims.

In accordance with the invention, manganese dioxide ore pulp is leached with sulphur dioxide in the usual manner. The solution thus formed is separated from the residue. This solution contains manganese sulphates and dithionates in indeterminate mixture and it may be treated in known manner to precipitate iron and phosphorus which may then be removed. The nearly saturated manganese sulphate-dithionate solution is then mixed with ammonium sulphate either in the form of crystals or strong solution. This results in the precipitation of crystals containing manganese and ammonium sulphates of substantially the composition $$MnSO_4(NH_4)_2SO_4.6H_2O$$

These crystals may be separated easily by settling or filtering. The mother liquor is then added to the manganese ore pulp in the leaching step.

The manganese dithionate in the solution reacts with the added ammonium sulphate to form the precipitated double salt, above referred to, and ammonium dithionate. This latter salt is extremely soluble and remains in the mother liquor. The building of ammonium dithionate in the mother liquor does not take place to an objectionable extent, even after many cycles. It appears that, when the ammonium dithionate reaches a certain concentration in the leaching step, the formation of dithionate by the reaction of sulphur dioxide with manganese dioxide is inhibited.

The dithionate in the mother liquor can be reduced by adding sulphuric acid. This drives off sulphur dioxide and forms ammonium sulphate from the ammonium dithionate. If desired, this sulphur dioxide may be used in the leaching step. The sulphuric acid thus introduced into the circuit in general will be neutralized by the manganous oxide content of the ore. The desired amount of manganous oxide can be formed by giving part of the ore a reducing roast before adding it to the leaching step.

There are several uses to which the double salt or crystals containing manganese and ammonium sulphates of substantially the composition $$MnSO_4(NH_4)_2SO_4.6H_2O$$

can be put. They are useful as a fertilizer or plant food since they are readily soluble. They may also be used as a constituent of electrolytes for the electro-deposition of manganese.

The manganese can be recovered readily from this crystallized salt. This may be accomplished in a number of ways; for example, by heating the salt in the presence of carbon, in which case there will be formed manganous oxide, ammonia, sulphur dioxide, and ammonium sulphate. The latter three will, of course, be vaporized and can be returned to the leaching step.

When the double salt is heated to about 500° C., the ammonium sulphate will be distilled off and pure, anhydrous manganese sulphate will be obtained, as a product. Experiments have demonstrated that practically all of the ammonium sulphate can be driven off in approximately two hours at a temperature of 535° C. Since the manganese sulphate is in soluble form, it may be used as a fertilizer or plant food. Since it is anhydrous, it lends itself readily to decomposition into manganese oxide and sulphur dioxide which may be reused in the leaching step. The ammonium sulphate, distilled off, may be recovered in a scrubbing tower and reused for the precipitation of more crystals from manganese sulphate solution.

Since the invention, as described herein, may be practiced otherwise, it is intended that all matter set forth herein shall be interpreted as in an illustrative and not in a limiting sense.

What is claimed is:

1. A cyclic process for recovering manganese values from manganese dioxide ore, which includes the steps of; dissolving the manganese from the ore with sulphur dioxide; separating the solution from the residue; adding ammonium sulphate to the solution to precipitate crystals of manganese ammonium sulphate; removing the crystals from the mother liquor; heating the crystals under reducing conditions to regenerate ammonium sulphate and sulphur dioxide for use in the earlier steps of the process; and returning the mother liquor to that part of the cycle in which the ore is dissolved.

2. That method of recovering manganese values from its ores, which includes the steps of, leaching the ore with sulphur dioxide; adding ammonium sulphate to the leach liquor to produce crystals of manganese and ammonium sulphate; removing the crystals; returning the mother liquor to the leaching step; adding carbon to the crystals and decomposing the same by heat to form a manganese compound, sulphur dioxide, and ammonium sulphate; and returning the sulphur dioxide and the ammonium sulphate to the leaching and crystallizing steps, respectively.

JOHN KOSTER.

REFERENCES CITED

The following references are of record in the file of this patent:

UNITED STATES PATENTS

| Number | Name | Date |
|---|---|---|
| 1,807,642 | Vadner | June 2, 1931 |

OTHER REFERENCES

Mellor, Comprehensive Treatise of Inorganic and Theoretical Chemistry, vol. 12, pages 414 and 415. Longmans, Green and Co., London (1932).

Schreinemakers, abstract of article in Chemical Abstracts, vol. 3, pages 1733–4. Published by American Chemical Society (1909).